United States Patent
Voit et al.

(10) Patent No.: US 10,313,396 B2
(45) Date of Patent: Jun. 4, 2019

(54) ROUTING AND/OR FORWARDING INFORMATION DRIVEN SUBSCRIPTION AGAINST GLOBAL SECURITY POLICY DATA

(71) Applicant: Cisco Technology, Inc., San Jose, CA (US)

(72) Inventors: Eric A. Voit, Bethesda, MD (US); Jyoti Verma, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 15/475,235

(22) Filed: Mar. 31, 2017

(65) Prior Publication Data

US 2018/0139240 A1    May 17, 2018

Related U.S. Application Data

(60) Provisional application No. 62/422,212, filed on Nov. 15, 2016.

(51) Int. Cl.
    *H04L 29/06*    (2006.01)
(52) U.S. Cl.
    CPC .......... *H04L 63/20* (2013.01); *H04L 63/1433* (2013.01)
(58) Field of Classification Search
    CPC ............................ H04L 63/20; H04L 63/1433
    See application file for complete search history.

(56) References Cited

U.S. PATENT DOCUMENTS

| | | | |
|---|---|---|---|
| 6,789,202 B1 | 9/2004 | Ko et al. | |
| 7,251,215 B1* | 7/2007 | Turner | H04L 12/4633 370/231 |
| 9,871,810 B1* | 1/2018 | Miskovic | H04L 63/1416 |
| 2002/0078381 A1* | 6/2002 | Farley | G06F 21/552 726/23 |
| 2003/0083847 A1* | 5/2003 | Schertz | G06F 21/55 702/186 |
| 2004/0098618 A1* | 5/2004 | Kim | H04L 63/1458 726/23 |
| 2004/0193912 A1 | 9/2004 | Li et al. | |
| 2005/0005017 A1* | 1/2005 | Ptacek | H04L 63/029 709/229 |

(Continued)

OTHER PUBLICATIONS

"Protecting the Cloud: Fortinet Technologies and Services that Address your Cloud Security Challenges", White Paper, Dec. 2016, www.fortinet.com, 9 pages.

(Continued)

*Primary Examiner* — Darren B Schwartz
(74) *Attorney, Agent, or Firm* — Edell, Shapiro & Finnan, LLC (57) ABSTRACT

Techniques are provided by which devices in a network may subscribe to a rapidly changing rules in central threat repository. The policies associated with threats are filtered so that just current attack vectors from within subnets learned via routing and/or forwarding information (at the network level of the network) are installed in the local access control list/policy database of the network devices. As routing changes occur, the list of applied policies are continually refined/revisited and pulled from a central security application. Publish/subscribe mechanisms ensure "zombie" policies are not left over in the device after reboot or routing changes occur.

20 Claims, 6 Drawing Sheets

(56) References Cited

U.S. PATENT DOCUMENTS

| | | | |
|---|---|---|---|
| 2005/0044406 A1* | 2/2005 | Stute | C12Q 1/6804 726/4 |
| 2007/0067839 A1* | 3/2007 | Hamada | H04L 41/5009 726/22 |
| 2007/0150579 A1* | 6/2007 | Morin | H04L 43/12 709/224 |
| 2007/0277242 A1* | 11/2007 | Baker | G06F 21/554 726/25 |
| 2009/0254970 A1* | 10/2009 | Agarwal | G06F 21/554 726/1 |
| 2014/0090056 A1* | 3/2014 | Manadhata | G06F 21/552 726/23 |
| 2014/0173712 A1* | 6/2014 | Ferdinand | H04L 63/02 726/11 |
| 2014/0351606 A1 | 11/2014 | Demilo et al. | |
| 2015/0128274 A1* | 5/2015 | Giokas | H04L 63/1416 726/23 |
| 2015/0207809 A1* | 7/2015 | Macaulay | G06F 21/552 726/22 |
| 2017/0142144 A1* | 5/2017 | Weinberger | H04L 63/0263 |
| 2017/0195355 A1* | 7/2017 | Wang | H04L 63/1425 |

OTHER PUBLICATIONS

"Is Your Data Secure?", White Paper, www.rti.com, v. 50024, 0814b, last accessed Mar. 30, 2017, 9 pages.

"Security Configuration Guide: Threat Information Distribution Protocol and TMS Cisco IOS Release 12.4T", Cisco Systems, Inc., http://www.cisco.com, May 5, 2010, 8 pages.

A. Clemm, et al., "Subscribing to YANG datastore push updates", draft-ieff-netconf-yang-push-05, NETCONF, Internet-Draft, Feb. 28, 2017, 53 pages.

Alok K. Sinha, "Cisco-Threat-Mitigation-Service-MIB.my MIB for TMS (Threat Mitigation Service)", Jan. 2007, https://iphostmonitor.com/mib/mib/CISCO-THREAT-MITIGATION-S . . . , 14 pages.

E. Voit, et al., "Requirements for Subscription to YANG Datastores", RFC 7923, Internet Engineering Task Force (IETF), ISSN: 2070-1721, Jun. 2016, 18 pages.

A. Atlas, et al., "An Architecture for the Interface to the Routing System", RFC 7921, Internet Engineering Task Force (IETF), ISSN: 2070-1721, Jun. 2016, 40 pages.

S. Appala, et al., "An Actionable Threat Intelligence System using a Publish-Subscribe Communications Model", WICSC'15, Oct. 12, 2015, DOI: http://dx.doi.org/10.1145/2808128.2808131, 10 pages.

* cited by examiner

ROUTING AND/OR FORWARDING INFORMATION DRIVEN SUBSCRIPTION AGAINST GLOBAL SECURITY POLICY DATA

PRIORITY CLAIM

This application claims priority to U.S. Provisional Patent Application No. 62/422,212, filed Nov. 15, 2016, the entirety of which is incorporated herein by reference.

TECHNICAL FIELD

The present disclosure relates to network security.

BACKGROUND

Resources and services exist to store and maintain information about known cybersecurity threats (attackers and hosts that have been compromised). This provides a large list of dynamic information that is, in most cases, too much information to be brought in its entirety to enterprise network endpoints. This information also iterates or changes frequently. The challenge is to determine how relevant subsets of that information can be brought into the network to maximize protection given limited memory and processing capability at security enforcement points.

DESCRIPTION OF EXAMPLE EMBODIMENTS

Overview

In one embodiment, a central security application downloads from a global resource of network security attacks a list of potential network security attacks (attacker identities). The central security application receives from one or more network devices or one or more hosts in the network one or more alerts for one or more potential network security threats which may impact the network. A list is generated and stored of one more network security attacks to be addressed in the network for a given period of time based on the list of potential network security attacks downloaded from the global resource and the one or more alerts. A network controller receives a notification that includes routing and/or forwarding information from a particular network device in the network. The network controller continuously determines whether to send to the particular network device a security policy associated with a domain indicated in the routing and/or forwarding information based on a comparison of the domain indicated in the routing and/or forwarding information with the list of one or more potential network security attacks.

DETAILED DESCRIPTION

A database of transient global and local domain security risks can be managed via global cybersecurity services, like the Talos™ threat intelligence service/organization dedicated to providing protection before, during, and after cybersecurity threats. The Talos service is an example of a global cybersecurity threat intelligence service that detects and correlates threats in real-time using a threat detection network that spans web requests, emails, malware samples, open source data sets, endpoint intelligence, and network intrusions. Cybersecurity experts work to proactively discover, assess, and respond to the latest trends in hacking activities, intrusion attempts, malware, and vulnerabilities with new detection and prevention content for all security products to better protect an organization.

A global cybersecurity threat intelligence service tracks threats across networks, end points, cloud environments, virtual systems, spam, Trojans, web, and email providing a comprehensive understanding of cyber threats, their root causes, and scopes of outbreaks. The global cybersecurity threat intelligence service pools leading expertise from software development, reverse engineering, malware research, intelligence analysis, and spam and web reputation to proactively discover the latest cyber threats. These resources provide the global cybersecurity threat intelligence service with a deep understanding of threats, their root causes, and the scope of outbreaks.

It can be difficult to very quickly distribute only the relevant policies to the edge devices of a routed network. This is difficult to do because a routing topology changes rapidly. This is especially difficult if there is not a central device maintaining a view of global topology.

There are challenges to be overcome. One challenge is that access control list (ACL) space on an edge network device may be limited. It is difficult to know how to limit internal threat defense policies so that only topologically relevant policies are installed on any particular network device. Another challenge is to ensure that irrelevant ACLs/policies are not left on a device as topologies shift, or threats go away.

Presented herein are techniques by which devices in a network subscribe to a central threat repository. The policies associated with threats are filtered so that just current attack vectors from within subnets learned via the routing process (at the network level of the enterprise network) are installed in the local access control list/policy database of the network devices. As routing changes occur, the list of applied policies are continually refined/revisited and pulled from the central security application. Publish/subscribe mechanisms ensure "zombie" policies are not left over in the device after reboot or routing changes occur.

Figure 1:
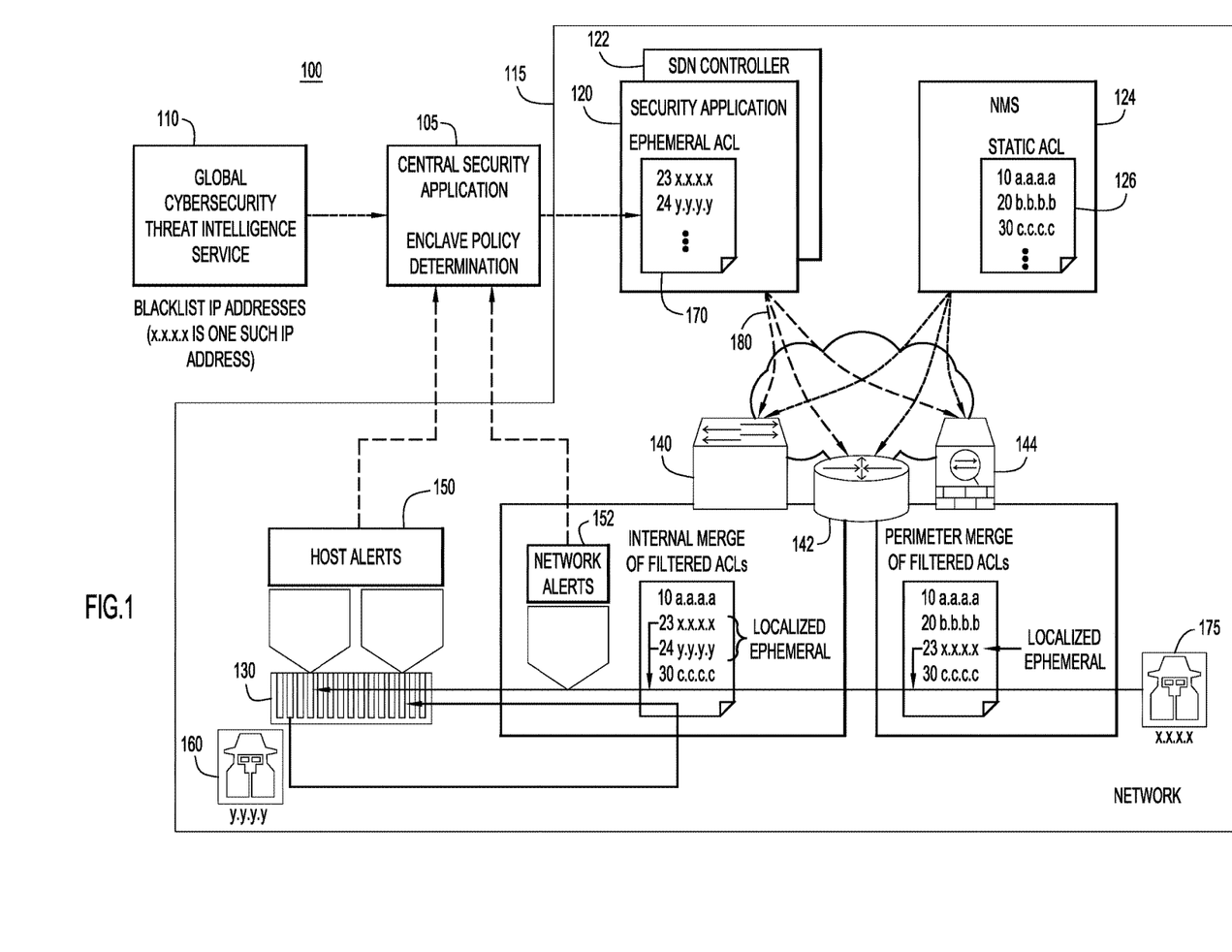
FIG. 1 is a block diagram of a system that is configured to using routing and/or forwarding information subscription to a global network security policy data store to improve network security performance in a network, according to an example embodiment.

FIG. 1 shows a system 100 in which a global cybersecurity threat intelligence service 110 maintains a set of global policies and threats. A central security application 105 is provided that runs on a server and which is in communication with the service 110 and with a network 115 to aggregate alerts from different sources in the network 115, including security infrastructure devices as well as network elements, and correlates them against the global threat intelligence obtained from the service 110, as well as other external threat intelligence sources. The network 115 may be a datacenter network, enterprise network, service provider network, etc.

The central security application 105, which generally may reside outside of the network 115 (although in some forms could reside inside the network 115), downloads form the service 110 a list of potential network security attackers (perhaps in the form of Internet Protocol (IP) addresses). The central security application 105 can determine that a trending indicator or compromise (IoC) is relevant in the network 115 and which particular internal hosts/users are participating in the incident. The central security application 105 generates network/endpoint/process-based responses and works with orchestrators and response systems to mitigate the threat. There is a local ephemeral extract of the set of global policies managed by a security application 120 on behalf of the network 115. Again, the challenge is determining which policies to download to the network 115. The network 115 includes computing equipment 130 and network devices 140, 142 and 144. This is a very simplified diagram of a network 115 for purposes of describing the concepts presented herein, and it should be understood that most networks include numerous instances of computing resources, storage resources, communication resources and network devices.

One response system for the network 115 may be a Software-Defined Network (SDN) controller. For example, a (local) security application 120 running on the SDN controller 122 may receive response from the central security application 105 and locally perform filtering. The SDN controller 122 is a computing resource. A network management system (NMS) 124 is shown as a different source of policy management that maintains static access control lists (ACLs) shown at reference numeral 126 that may apply to all network elements in the network 115. The central security application 105 may receive security/threat alerts from host alerts 150 from the computing equipment 130 as well as network alerts 152 from network devices 140, 142 and 144, as shown in FIG. 1. Local routers can identify traffic problems. For example, the network devices 140, 142 and 144 may detect a large increase in connected host response times, and based on this, generate an alert to the central security application 105. These alerts indicate one or more potential network security threats from within or beyond the network 115. It should be understood that the SDN controller 122 that runs the security application 120 need not physically reside in the same building/campus as that of the computing equipment 130 and network devices 140, 142 and 144.

Host alerts may be generated by software running on equipment in the network 115. In one example, the software is an open source software known as Snort™, made available by Cisco Systems, Inc. These alerts are sent to the security application 120.

When facing the open internet with an attacker like x.x.x.x, it might be assumed that the number of policies to download is a very large list. And it would be. The global cybersecurity threat intelligence service 110 may be sending thousands of blacklist IP addresses every day, x.x.x.x being only one of them, as an example. However, an attacker such as y.y.y.y shown at reference numeral 160 may be identified within the computing equipment 130, via the host alerts 150. More precisely, a hacker has compromised device y.y.y.y, and y.y.y.y is the only identified attack vector that might be immediately addressed. As shown in FIG. 1, y.y.y.y is not going through some central firewall, and therefore cannot be filtered by a central firewall with a large memory footprint. In this case, all the filtering rules for the Internet are not needed. It is sufficient to provide protection at the access edge (e.g., network devices 140, 142 and 144) of the network 115 from the potentially compromised devices which might also exist in the access domain. The network devices 140, 142 and 144 may be switches, routers, gateways, firewalls, or any network device or network security appliances, in hardware or software form.

The host alerts 150 and network alerts 152 can identify, to the central security application 105, that there is in fact a threat occurring in the network 115. The central security application 105 has a list of potential attackers (from the service 110) and a list of potential intrusion events/attacks (from the host alerts 150 and network alerts 152) that may identify an attacker. Therefore, the central security application 105 can determine that a known attack/threat is currently active in the network 115, and should be addressed now. The central security application 105 builds a list, identified in FIG. 1 as the ephemeral access control list (ACL) 170, which identifies one or more attackers that should be addressed in the network 115 for a given period of time. The list 170 may be ephemeral in the sense that it is valid for a period of time from minutes to one or two days. In the example of FIG. 1, the entries in the list 170 are attackers 23 x.x.x.x and 24 y.y.y.y. The central security application 105 sends information describing the list 170 to the security application 120, for example. The list 170 serves as a dynamic filter that is maintained by the security application 120, and only a subset of the list 170 is downloaded to the equipment in the network 115, as described below.

One way to know what might be in the access domain is to look at the routing tables for a device. For any paths where routes are learned (i.e., not default paths), it is possible to subscribe to current known hosts within those subnets where an attack vector might be known to exist. The network devices in the network 115 have knowledge that a given route (e.g., x.x.x.x) are routes that are external to the network 115. Consequently, the security policy for that route can be brought down into the network (e.g., to one or more of network devices 140, 142 and 144) from the list 170 maintained by the security application 120, as shown at reference numeral 180 in FIG. 1. A publish/subscribe mechanism may be particularly useful because it allows dynamic maintenance of the set of potential attack subnets which might be filtered. It is only necessary to download policies and then filter on the ingress traffic from those subnets where the attack vector is believed to be occurring.

On the left side of FIG. 1, there is a threat "y.y.y.y" in the network 115 as shown at 160. The security policy for the threat that is known in the network 115 ("y.y.y.y") is downloaded from the list 170 to network device 140, as an example. In general, as routing changes occur, security policies are downloaded and applied only for traffic which might come from a domain where an attack vector is known to exist. A different threat "x.x.x.x" is shown at reference numeral 175 in FIG. 1.

Figure 2:
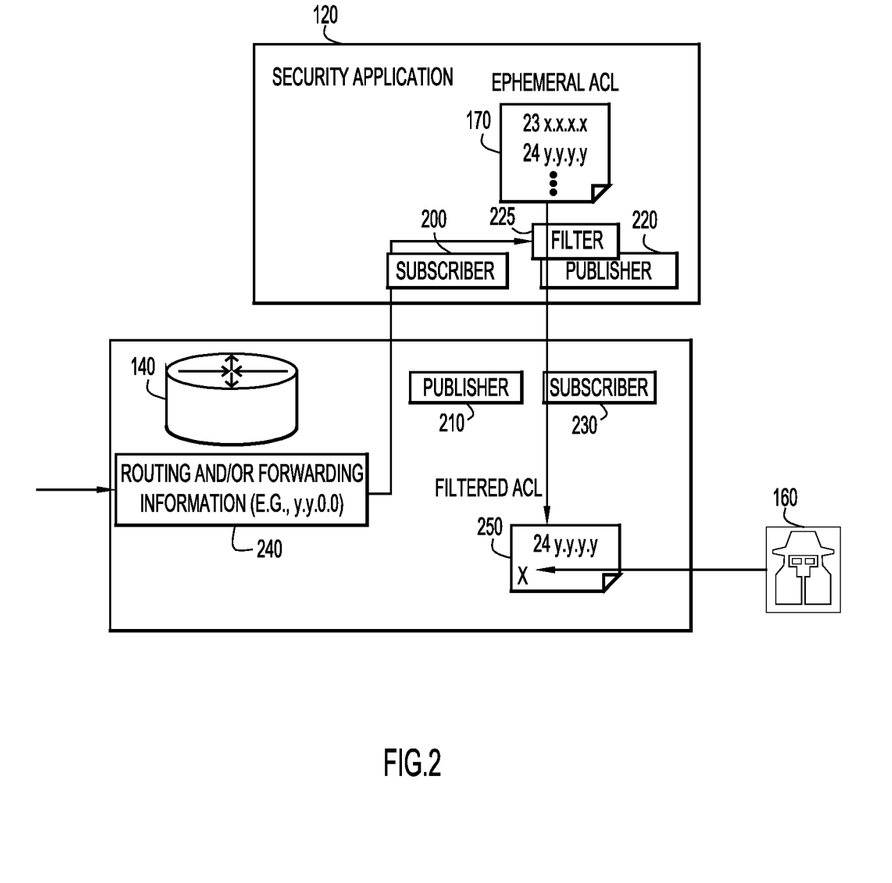
FIGS. 2 and 3 are diagrams illustrating how information about network security policies for specific routes can be delivered to network devices in a network, according to example embodiments.
Figure 3:
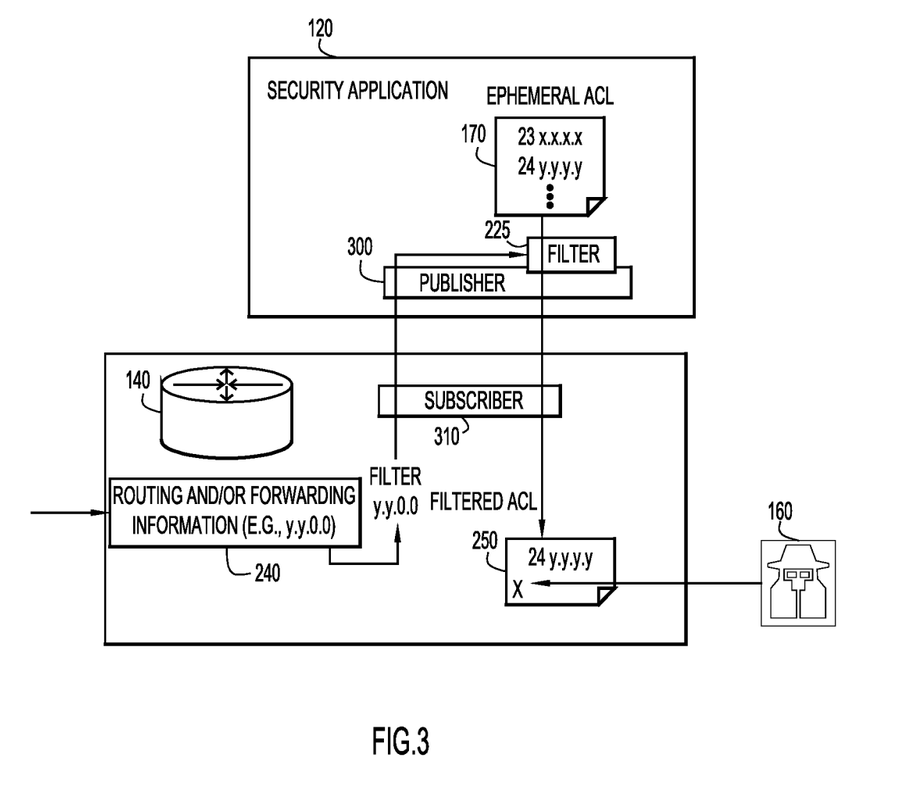

Reference is now made to FIGS. 2 and 3. The security policies may be maintained via a publish/subscribe (Pub/Sub) mechanism that keeps the local device up to date with the latest risks. In the embodiment of FIG. 2, there is a subscriber function 200 at the security application 120 that subscribes to a publisher function 210 at the network device 140 for routes on the network device 140. There is also a publisher function 220 running at the security application 120 that is associated with a filter function 225 and which receives requests from a subscriber function 230 running at the network device 140. The publisher function 210 on the network device 140 publishes a routing and/or forwarding information shown at reference numeral 240 (y.y. 0.0) to the subscriber function 200 at the security application 120. The routing and/or forwarding information may include or take the form of a route advertisement. Based on the routing and/or forwarding information 240, the publisher function 220 associated with filter function 225 at the security application 120 sends to the subscriber function 230 the security policy 250 to block traffic associated with 24.y.y.y.y based on the list 170 maintained by the security application 120.

In the embodiment of FIG. 3, there is a publisher function 300 running at the security application 120 and a subscriber function 310 running at the network device 140. The subscriber function 310 sends a policy/filter request for routing and/or forwarding information 240 to the publisher function 300 at the security application 120. The publisher function 300 sends the policy 250 to the network device 140 based on the list 170 maintained by the security application 120.

In the embodiments of both FIGS. 2 and 3, a dynamic routing and/or forwarding information (e.g., a route advertisement) results in modification of a filter against a global list (the list 170) maintained by the security application 120. This is not otherwise possible today because there is no capability heretofore known in which actual network routes are used to be applied as a filter criteria to a global data store. This allows a small subset of Internet attacks to be maintained and only the relevant attacks are used to supply policies to the network. In other words, it is only necessary to download policies related to the dynamic set of interfaces from which there may be traffic because the attacker has an address, and a filter is applied to traffic that comes from that address (based on the routing topology). The routing topology is known by the routing and/or forwarding information at the network level. This mechanism is automatically self-correcting because it is based on current routing and/or forwarding information, and the policies are updated at the network level according to the current routing and/or forwarding information.

As a further feature, a subscription may be configured such that the filter being applied is able to compensate for virtual routing forwarding (VRF) and network address translation (NAT) route information perhaps not visible to the subscriber at the network devices. This would be done by maintaining a view of network topology within the controller 122 that can be applied against the subscription filter.

Subscription may be made not just to ACLs at network devices 140, 142, and 144. Subscription may be made to Security Group Tags (SGT) or other forwarding context information that could be applied to an incoming flow/address. A security group is a grouping of users, endpoint devices, and resources that share access control policies. Once a device is authenticated, any packet that originates from that device may be tagged with an SGT that contains the security group number of the device. The packet carries this SGT throughout the network within a header, e.g., a trusted security (TrustSec) header. The SGT is a single label that determines the privileges of the source within the entire enterprise.

Because the SGT contains the security group of the source, the tag can be referred to as the source SGT. The destination device is also assigned to a security group (the destination SG) that can be referred to for simplicity as the destination group tag (DGT).

In other words, a network device may use information maintained by the security application 120 in order to tag traffic so that it gets specific treatment in the network, rather than just dropping the traffic. Using security group access control lists (SGACLs), one can control the operations that users can perform based on the security group assignments of users and destination resources. Policy enforcement may be represented by a permissions matrix, with source security group numbers on one axis and destination security group numbers on the other axis. By assigning users and devices within the network to security groups and applying access control between the security groups, a role-based topology-independent access control may be achieved within the network. Because SGACLs define access control policies based on device identities instead of IP addresses as in traditional ACLs, network devices are free to move throughout the network and change IP addresses. As long as the roles and the permissions remain the same, changes to the network topology do not change the security policy.

Access control may be implemented using ingress tagging and egress enforcement. At an ingress point to a domain, traffic from the source is tagged with an SGT containing the security group number of the source entity. The SGT is propagated with the traffic across the domain. At the egress point of the domain, an egress device uses the source SGT and the security group number of the destination entity (the destination SG, or DGT) to determine which access policy to apply from the SGACL policy matrix. SGACL enforcement is applied only on IP traffic, but enforcement can be applied to either routed or switched traffic.

For routed traffic, SGACL enforcement is performed by an egress switch, typically a distribution switch or an access switch with a routed port connecting to the destination host. When SGACL enforcement is enabled globally, enforcement is automatically enabled on every Layer 3 interface except for switch virtual interfaces (SVIs).

For switched traffic, SGACL enforcement is performed on traffic flowing within a single switching domain without any routing function. An example would be SGACL enforcement performed by a data center access switch on server-to-server traffic between two directly connected servers. In this example, the server-to-server traffic would typically be switched. SGACL enforcement can be applied to packets switched within a virtual local area network (VLAN) or forwarded to an SVI associated with a VLAN, but enforcement may be enabled explicitly for each VLAN.

Thus, using SGTs and the techniques presented herein, traffic can be tagged so that it gets specific treatment, rather than just dropping it (based on an ACL entry, for example). Thus the security policy sent to a network device based on the list of network security attacks may be to tag traffic (incoming flow or address) for specific handling in the network rather than just dropping the traffic.

The techniques presented herein have the benefit of not requiring a controller or application to maintain the full topology of a domain. It is the device (e.g., network devices 140, 142 and 144 shown in FIG. 1) that reaches out and maintains its local security policy rule-base as a subset of the global one maintained by the controller.

Figure 4:
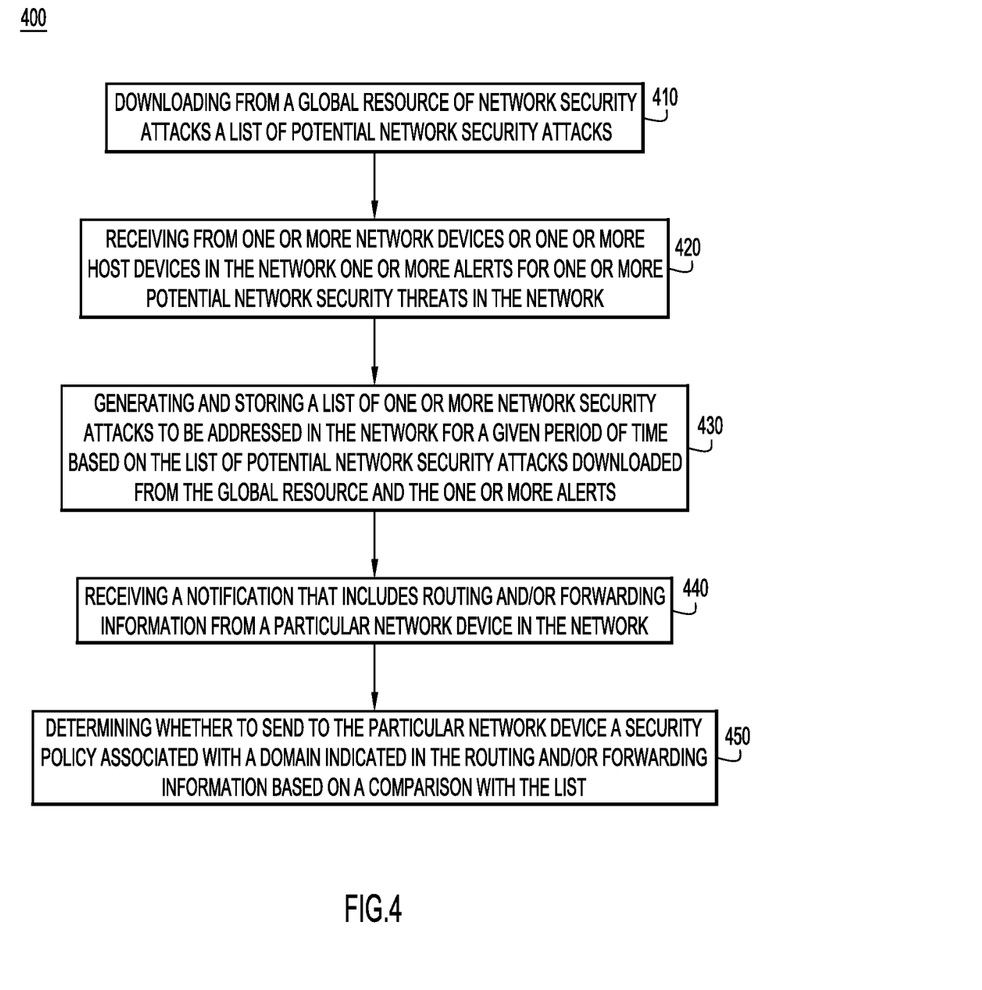
FIG. 4 is a flow chart of a method according to an example embodiment.

Reference is now made to FIG. 4. FIG. 4 illustrates a flow chart for a computer-implemented method 400 that generalizes the techniques described above in connection with FIGS. 1-3. Reference is also made to FIGS. 1-3 for purposes of describing the flow chart of FIG. 4 At 410, a central security application (e.g., application 105 in FIG. 1) downloads from a global resource of network security attacks a list of potential network security attacks, such as attacker identifies (IP addresses). At 420, the central security application 105 receives from one or more network devices or one or more hosts (applications running on computing equipment) in the network one or more alerts for one or more potential network security threats which may impact the network. At 430, the central security application 105 generates an ephemeral list of one more network security attacks to be addressed in the network for a given period of time based on the list of potential network security attacks downloaded from the global resource and the one or more alerts. The central security application may send this list to a local security application, such as the local security application 120 running on SDN controller 122. At 440, the network controller receives a notification that includes routing and/or forwarding information from a particular network device in the network. At 450, the network controller determines whether to send to the particular network device a security policy associated with a domain indicating in the routing and/or forwarding information based on a comparison of the domain indicating in the routing and/or forwarding information with the list of one or more network security attacks. The determination operation 450 may involve determining to send the security policy associated with the domain indicated in the routing and/or forwarding information when there is a match of the domain of the routing and/or forwarding information with a domain indicated in the list of one or more network security attacks. In other words, the determining operation 450 involves comparing the domain of the routing and/or forwarding information against a domain of one or more network security attacks contained in the list. This may be based on network topology information maintained by a network controller that takes into account virtual routing and/or forwarding information or network address translation information. The receiving operation 440 may be performed with respect to routing and/or forwarding information received from multiple ones of the plurality of network devices in the network, in which case, the determining operation 450 is performed with respect to the routing and/or forwarding information received from the multiple ones of the plurality of network devices. Operation 450 is continually performed based on received notifications of routing and/or forwarding information.

As explained above in connection with FIGS. 1-3, the list may have an ephemeral membership reflecting a continually changing set of attackers and attacks. The security policy associated with the domain of the routing and/or forwarding information is sent when there is a match of the domain of the routing and/or forwarding information with a domain indicated in the list of one or more network security attacks.

Figure 5:
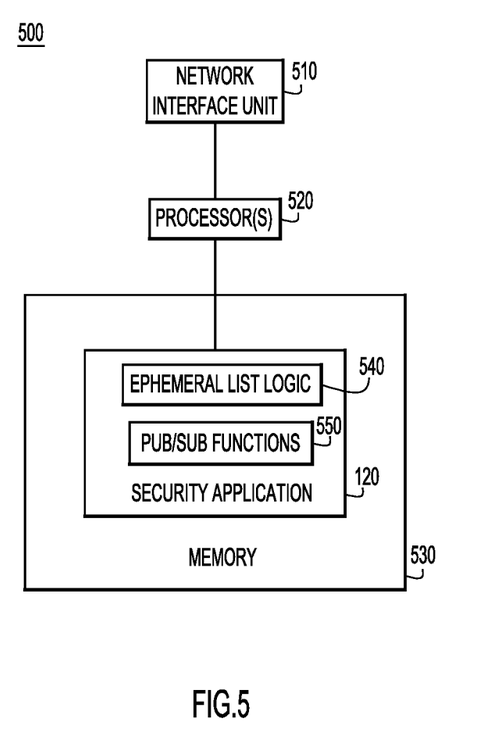
FIG. 5 is a block diagram of a computing device that performs operations to deliver route-specific network security policies to network devices, according to an example embodiment.

FIG. 5 illustrates a block diagram of a computing device 500, e.g., the network controller 122, on which the security application 120, shown in FIG. 1, may reside. The computing device 500 includes a network interface unit 510 (one or more network interface cards), one or more processors 520, and memory 530. The memory 530 stores, among other things, software instructions for the security application 120, which includes instructions for the ephemeral list logic 540 and the pub/sub functions 550 to perform the operations described above in connection with FIGS. 1-4.

The memory 530 may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed it is operable to perform the operations described herein.

Figure 6:
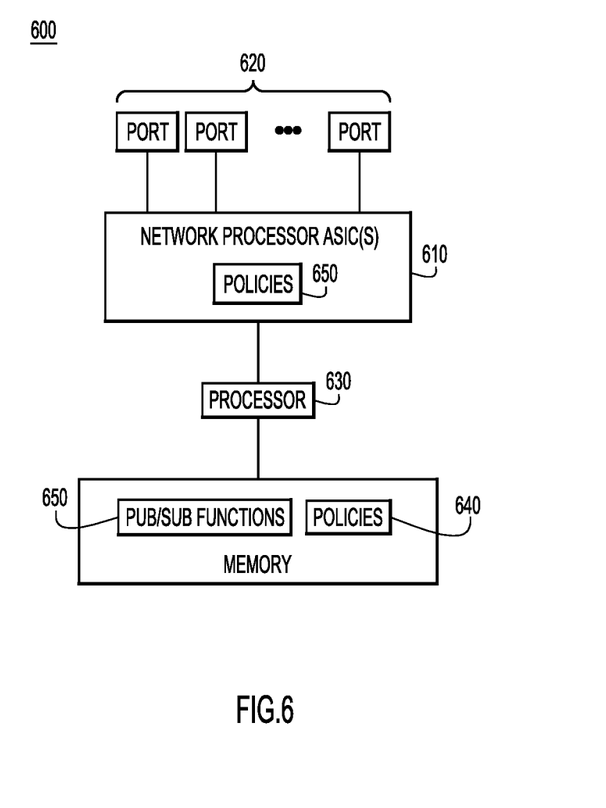
FIG. 6 is a block diagram of a network device that is configured to request, receive and operate on route-specific network security policies, according to an example embodiment.

FIG. 6 illustrates a block diagram of a network device 600 configured to perform the operations described herein. The network device 600 includes one or more network processor Application Specification Integrated Circuits (ASICs) 610, a plurality of ports 620 on which network is received and sent, a processor 630 and memory 640. The memory stores 640, among other things, the select/subset of network policies 650 obtained from the ephemeral ACL maintained by the security application, as well as software instructions for the pub/sub functions 650 used for the operations described above in connection with FIGS. 2 and 3. The data describing the subset of policies 650 may also be stored in the network processor ASIC 610 instead of in memory 640 as shown in FIG. 6.

In summary, presented herein is a system by which devices in an enterprise network subscribe to a central threat repository. The security policies associated with threats are filtered so that just current attack vectors from within subnets learned via the routing and/or forwarding information (at the network level of the network) are installed in the local ACL/policy database of the network devices. As routing changes occur, the list of applied policies are continually refined/revisited and pulled from the central security application. Pub/sub mechanisms ensure zombie policies are not left over in the device after reboot or routing changes occur.

It is not heretofore known to use dynamic security policies and apply them at the access edge of the network. Network security performance is greatly improved over existing schemes that try to maintain the full attacker list because only locally relevant attack vectors are maintained as access policies in this system. Any access switch vendor as well as any virtual switching vendor may want to provide protection from attacks between hosts on their locally managed connections, using the system and techniques presented herein. The system and techniques are useful for both perimeter blocking and internal blocking.

In summary, in one form, a method is provided comprising: downloading from a global resource of network security attacks a list of potential network security attacks; receiving from one or more network devices or one or more hosts in a network one or more alerts for one or more potential network security threats which may impact the network; generating and storing a list of one more network security attacks to be addressed in the network for a given period of time based on the list of potential network security attacks downloaded from the global resource and the one or more alerts; receiving a notification that includes routing and/or forwarding information from a particular network device in the network; and determining whether to send to the particular network device a security policy associated with a domain indicated in the routing and/or forwarding information based on a comparison of the domain indicated in the routing and/or forwarding information with the list of one or more potential network security attacks.

In another form, an apparatus is provided comprising: a network interface unit configured to enable network communications with a plurality of network devices and computing equipment in a network; a processor coupled to the network interface unit, wherein the processor is configured to: download from a global resource of network security attacks a list of potential network security attacks; receive from one or more network devices or one or more hosts in the network one or more alerts for one or more potential network security threats in the network; generate and store a list of one more network security attacks to be addressed in the network for a given period of time based on the list of potential network security attacks downloaded from the global resource and the one or more alerts; receive a notification of routing and/or information from a particular network device in the network; and determine whether to send to the particular network device a security policy associated with a domain indicating in the routing and/or forwarding information based on a comparison of the domain indicated in the routing and/or forwarding information with the list.

In still another form, one or more computer readable storage media are provided that are encoded with software comprising computer executable instructions and when the software is executed operable to perform operations including: downloading from a global resource of network security attacks a list of potential network security attacks; receiving from one or more network devices or one or more hosts in a network one or more alerts for one or more potential network security threats in the network; generating and storing a list of one more network security attacks to be addressed in the network for a given period of time based on the list of potential network security attacks downloaded from the global resource and the one or more alerts; receiving a notification that includes routing and/or forwarding information from a particular network device in the network; and determining whether to send to the particular network device a security policy associated with a domain indicated in the routing and/or forwarding information based on a comparison of the domain indicated in the routing/and or forwarding information with the list of one or more potential network security attacks.

In yet another form, a system is provided comprising: a central security application configured to download from a from a global resource of network security attacks a list of potential network security attacks; a plurality of network devices in a network; and a software defined network controller configured to control the plurality of network devices in the network, wherein the software defined network controller executes a local security application that receives from one or more network devices or one or more hosts in the network one or more alerts for one or more potential network security threats in the network, generates and stores a list of one more network security attacks to be addressed in the network for a given period of time based on the list of potential network security attacks downloaded from the global resource and the one or more alerts, receives a notification of routing and/or information from a particular network device in the network, and determines whether to send to the particular network device a security policy associated with a domain indicating in the routing and/or forwarding information based on a comparison of the domain indicated in the routing and/or forwarding information with the list.

The above description is intended by way of example only. While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method comprising:
   downloading from a global resource of network security attacks a list of potential network security attacks;
   receiving from one or more network devices or one or more hosts in a network one or more alerts for one or more potential network security threats in the network;
   generating and storing a list of one or more network security attacks to be addressed in the network for a given period of time based on the list of potential network security attacks downloaded from the global resource and the one or more alerts;
   receiving a notification that includes routing and/or forwarding information from a particular network device in the network;
   determining whether to send to the particular network device a security policy associated with a domain indicated in the routing and/or forwarding information based on a comparison of the domain indicated in the routing and/or forwarding information with the list of one or more potential network security attacks; and
   sending to the particular network device the security policy associated with the domain of the routing and/or forwarding information based on the comparison.

2. The method of claim 1, wherein the list has an ephemeral membership reflecting a continually changing set of attackers and attacks.

3. The method of claim 1, wherein sending includes sending the security policy associated with the domain of the routing and/or forwarding information when there is a match of the domain of the routing and/or forwarding information with a domain indicated in the list of one or more potential network security attacks.

4. The method of claim 3, wherein the security policy includes information tagging traffic in the network for specific handling.

5. The method of claim 1, wherein receiving a notification includes a subscriber function at a network controller subscribing to a publisher function on the particular network device.

6. The method of claim 5, wherein sending includes a publisher function at the network controller sending the policy to the particular network device in response to a request relating to the particular network device when it is determined that there is a match of the domain of the routing and/or forwarding information with a domain in the list of one or more potential network security attacks.

7. The method of claim 1, wherein receiving a notification includes:
   a publisher function at a network controller receiving from a subscriber function at the particular network device a request including the routing and/or forwarding information for the particular network device.

8. The method of claim 7, wherein sending includes the publisher function at the network controller sending the security policy to the subscriber function on the particular network device when it is determined that there is a match of the domain of the routing and/or forwarding information with a domain indicated in the list of one or more potential network security attacks.

9. The method of claim 1, wherein determining comprises comparing the domain of the routing and/forwarding information against a domain of one or more potential network security attacks contained in the list.

10. The method of claim 1, wherein determining is further based on network topology information maintained by a network controller that takes into account virtual routing and/or forwarding information or network address translation information.

11. The method of claim 1, wherein the list contains access control list entries.

12. The method of claim 1, wherein receiving a notification is performed with respect to routing and/or forwarding information received from multiple ones of the plurality of network devices, and determining is performed with respect to the routing and/or forwarding information received from the multiple ones of the plurality of network devices.

13. An apparatus comprising:
a network interface unit configured to enable network communications with a plurality of network devices and computing equipment in a network;
a processor coupled to the network interface unit, wherein the processor is configured to:
download from a global resource of network security attacks a list of potential network security attacks;
receive from one or more network devices or one or more hosts in the network one or more alerts for one or more potential network security threats in the network;
generate and store a list of one or more network security attacks to be addressed in the network for a given period of time based on the list of potential network security attacks downloaded from the global resource and the one or more alerts;
receive a notification of routing and/or information from a particular network device in the network;
determine whether to send to the particular network device a security policy associated with a domain indicating in the routing and/or forwarding information based on a comparison of the domain indicated in the routing and/or forwarding information with the list; and
send to the particular network device the security policy associated with the domain of the routing and/or forwarding information based on the comparison.

14. The apparatus of claim 13, wherein the processor is configured to determine to send the security policy associated with the domain of the routing and/or forwarding information when there is a match of the domain of the routing and/or forwarding information with a domain indicated in the list of one or more potential network security attacks.

15. The apparatus of claim 13, wherein the list has an ephemeral membership reflecting a continually changing set of attackers and attacks.

16. The apparatus of claim 13, wherein the processor is configured to determine by comparing the domain of the routing and/or forwarding information against a domain of one or more network security attacks contained in the list.

17. The apparatus of claim 13, wherein the processor is configured to determine further based on network topology information that takes into account virtual routing forwarding information or network address translation information.

18. One or more non-transitory computer readable storage media encoded with software comprising computer executable instructions and when the software is executed operable to perform operations including:
downloading from a global resource of network security attacks a list of potential network security attacks;
receiving from one or more network devices or one or more hosts in a network one or more alerts for one or more potential network security threats in the network;
generating and storing a list of one or more network security attacks to be addressed in the network for a given period of time based on the list of potential network security attacks downloaded from the global resource and the one or more alerts;
receiving a notification that includes routing and/or forwarding information from a particular network device in the network;
determining whether to send to the particular network device a security policy associated with a domain indicated in the routing and/or forwarding information based on a comparison of the domain indicated in the routing/and or forwarding information with the list of one or more potential network security attacks; and
sending to the particular network device the security policy associated with the domain of the routing and/or forwarding information based on the comparison.

19. The non-transitory computer readable storage media of claim 18, wherein the instructions operable for determining include instructions operable for determining to send the security policy associated with the domain of the routing and/or forwarding information when there is a match with a domain indicated in the list of one or more potential network security attacks.

20. The non-transitory computer readable storage media of claim 18, wherein the list has an ephemeral membership reflecting a continually changing set of attackers and attacks.

* * * * *